(12) United States Patent
Chab et al.

(10) Patent No.: US 7,654,737 B2
(45) Date of Patent: Feb. 2, 2010

(54) ACCESSORY FOR MEASURING TEMPERATURES IN SOLIDIFIED PRODUCTS SUCH AS FROZEN MEATS AND FROZEN FOOD IN GENERAL

(76) Inventors: Gabriel Elias Chab, Gurruchaga 1177 Piso 4, (1414) Buenos Aires (AR); Teodoro Roberto Suguer, Gurruchaga 1177 Piso 4, (1414) Buenos Aires (AR)

(*) Notice: Subject to any disclaimer, the term of this patent is extended or adjusted under 35 U.S.C. 154(b) by 0 days.

(21) Appl. No.: 11/888,821

(22) Filed: Aug. 2, 2007

(65) Prior Publication Data
US 2009/0034583 A1 Feb. 5, 2009

(51) Int. Cl.
*G01K 13/00* (2006.01)
*G01K 1/00* (2006.01)

(52) U.S. Cl. .................. 374/208; 374/194; 374/155; 206/306

(58) Field of Classification Search .......... 374/155, 374/208, 194; 81/3.45; 206/306
See application file for complete search history.

(56) References Cited

U.S. PATENT DOCUMENTS

| | | | | |
|---|---|---|---|---|
| 1,330,689 A | * | 2/1920 | Drew | 81/3.45 |
| 1,981,781 A | * | 11/1934 | Collette | 81/3.45 |
| 2,342,156 A | * | 2/1944 | Miller | 81/3.45 |
| 6,536,306 B1 | * | 3/2003 | Harris | 81/3.09 |
| 6,854,883 B2 | * | 2/2005 | Rund et al. | 374/208 |
| 2004/0091018 A1 | * | 5/2004 | Soavi et al. | 374/155 |
| 2007/0133654 A1 | * | 6/2007 | Harris | 374/121 |

FOREIGN PATENT DOCUMENTS

GB 2147418 A * 5/1985

* cited by examiner

*Primary Examiner*—Gail Verbitsky
*Assistant Examiner*—Mirellys Jagan
(74) *Attorney, Agent, or Firm*—Defillo & Associates, Inc.; Evelyn A. Defillo

(57) ABSTRACT

An accessory for measuring temperature in solidified products such as frozen meats and frozen food in general, adapted to pierce the frozen product. The accessory comprises a cavity enclosing a thermometry element suitable for such purpose and is defined by a body made of a thermo-conducting material. The accessory comprises a tubular portion that can be inserted into the product which temperature needs to be measured, and an operator handle for the accessory. A cavity enclosing a temperature sensing element extends along the tubular portion to the proximity of its distal end, which has a pointed end. The distal section of the tubular portion comprises at least one helical cutting edge for cutting the frozen product, which allows the insertion of the accessory when being turned. The operator handle is perpendicular to the longitudinal axis of the tubular portion, and comprises a hole that connects with the cavity that contains the temperature sensing element.

7 Claims, 5 Drawing Sheets

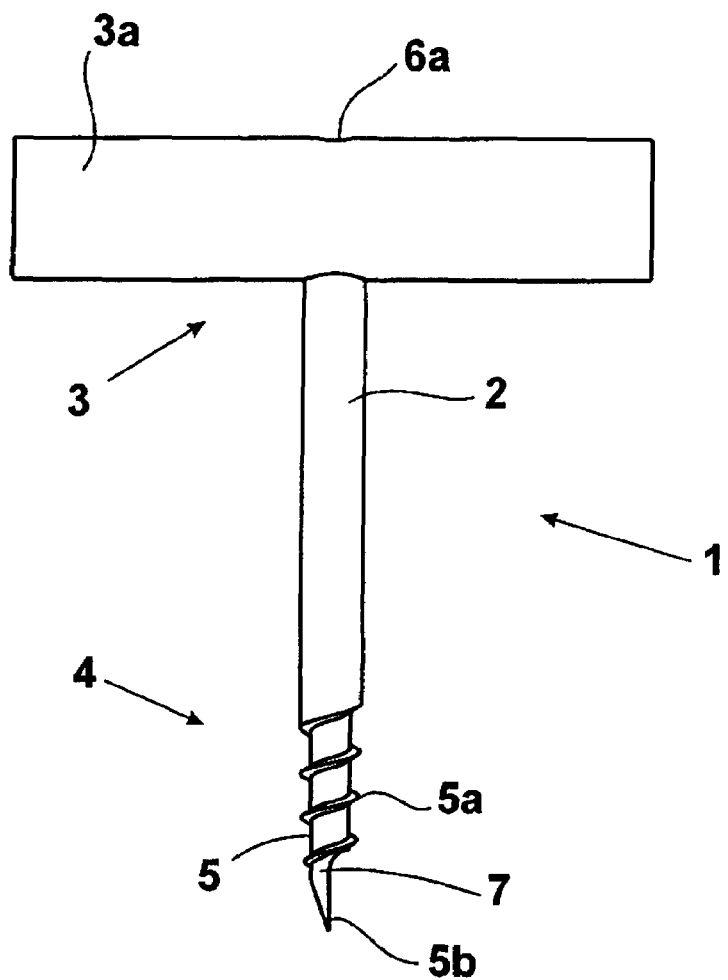
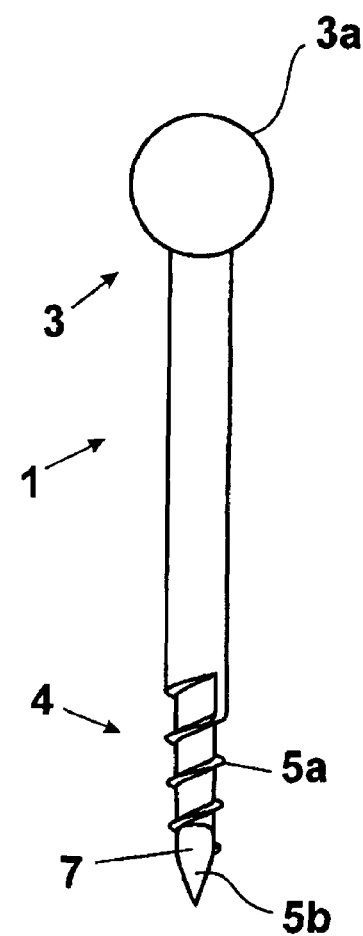
FIG. 1  FIG. 2

ACCESSORY FOR MEASURING TEMPERATURES IN SOLIDIFIED PRODUCTS SUCH AS FROZEN MEATS AND FROZEN FOOD IN GENERAL

FIELD OF THE INVENTION

The present invention refers to an accessory for measuring temperatures in solidified products such as frozen meats and frozen food in general and, more particularly it relates to a thermoconducting accessory especially adapted to pierce a frozen product which inner temperature needs to be controlled, and to enclose therein a thermometry element suitable for such purpose.

BACKGROUND OF THE INVENTION

Temperature control is an important factor in products which proper state of conservation for subsequent consumption or use, depends on their being kept at a given temperature. This is the case, for example, of the food industry of frozen products and, particularly, of the meat industry. In this sense, it is well known that meat conservation at the adequate temperature is one of the main conditions required to prevent the development of bacteria and microorganisms posing a health risk both to human beings and animals consuming such meats. This applies to food storage and transport as well as to cooking.

The international organizations which establish food conservation standards recommend that temperature measurement be made taken both on the surface and the inside of food products. Undoubtedly, measuring the inner temperature is difficult in the case of frozen foods, because the penetration probes used for this purpose, usually called meat probes, cannot penetrate the food product due to molecule crystallization and subsequent hardening of the product.

In the prior art on the subject matter several devices and methods are known for piercing frozen foods and measuring their inner temperature. One of the most rudimentary forms is to pierce them using a nail and hammer so to make a hole which allows introducing a measuring probe, but the problem is that the fact of "hammering" a frozen piece poses the risk of damaging or fracturing the piece of food. It is also possible to use an electric drill to do the piercing, but this method considerably increases the temperature of the frozen food because of the friction generated by the drill bit and, besides, it is not always possible to use this method in places where the temperature of frozen products is controlled on a regular basis, such as cold storage chambers, refrigerated trucks, storage warehouses and transport, etc.

Another well-known device consists of a stainless steel probe with a "bit brace" type end containing a thermistor or thermocouple therein, where the probe usually has a plug connecting to some kind of digital thermometer or, else, can include a digital indicator or display head. This device solves the main disadvantages of the previously mentioned devices, since penetration is done smoothly, without any risk of damaging the piece to be measured and without friction that would modify its temperature, while requiring little physical effort from the operator. For this reason these devices are widely used in the market. Nevertheless, one of their main disadvantages is their high cost, plus the fact that they need frequent replacement because the head is generally made of plastic and, therefore, is easily damaged by use.

Contrarily to the devices previously mentioned as prior art examples, the instant accessory for measuring temperatures in solidified products, such as frozen meats and frozen food in general, provides easy piercing of the frozen products and taking a correct temperature measurement therein, as it will be clearly evidenced in the detailed description, which makes reference to the drawings shown according to a preferred embodiment to be put into practice.

The advantages of the proposed accessory include its "universal" nature, i.e., its capacity to adapt to most of the meat probe thermometers known, so it can be used even with thermometers which are not adapted to pierce hard substances such as frozen products. On the other hand, by avoiding mechanical efforts on the structure of the meat probe thermometer, this accessory extends its useful life and allows using fragile thermometers without damaging them even after repeated use. Due to its structural sturdiness, as it is made of stainless steel, normally this accessory is not likely to break and needs no replacement of pieces because it will not wear out in continuous use.

Another advantage lies in its bit brace end which allows smooth penetration without damaging the piece or generating temperature increases induced by friction.

A further advantage of the accessory of the invention is that the response of the probe, the temperature sensor or the thermometer being used is virtually as fast as if it were directly in contact with the product which temperature is being measured. This is because the temperature-sensitive end is located inside the accessory only a few millimeters away from the outer surface, and this reduces considerably the thermal lag.

Still another advantage of this accessory is that it features a fixed or removable traverse operator handle, providing the operator with added torque to pierce the frozen food with minimum effort.

An additional advantage of the accessory of the invention is that it can also be used to measure higher temperatures, such as those occurring in cooked food, which inner temperature needs to be precisely controlled.

SUMMARY OF THE INVENTION

It is therefore an object of the invention to provide an accessory for measuring the temperature of solidified products such as frozen meats and frozen food in general, which accessory is adapted to pierce the frozen product, and comprises an inner cavity for enclosing an appropriate thermometry element for such purpose. The accessory is defined by a body made of a thermo-conducting material, such body comprising a tubular portion adapted to be inserted into the product which inner temperature needs to be measured, and an operator handle to operate the accessory. An inner cavity is arranged along the tubular portion of the accessory, to enclose the temperature sensing element, such cavity extending to the proximity of the distal end of the tubular portion, which tubular portion has a pointed end. The distal section of the tubular portion comprises at least one helical cutting edge for inserting the accessory into the frozen product when it is caused to turn. The operator handle is perpendicular to the longitudinal axis of the tubular portion, said handle comprising an opening that connects to the cavity which contains the temperature sensing element.

BRIEF DESCRIPTION OF THE DRAWINGS

For the sake of clarity and better comprehension of the instant utility model, the invention is illustrated by means of several drawings where it is represented in one of its preferred embodiments, only by way of illustration and without limitation, wherein:

FIG. 1 is an elevational front view of the accessory of the invention, for measuring temperatures in solidified products such as frozen meat and food in general.

FIG. 2 is a elevational side view of the accessory.

FIG. 7b is a detailed view of the longitudinal cross-sectional view of FIG. 7a.

In these figures the same numerals identify identical or equivalent parts.

DETAILED DESCRIPTION OF THE INVENTION

Figure 3:
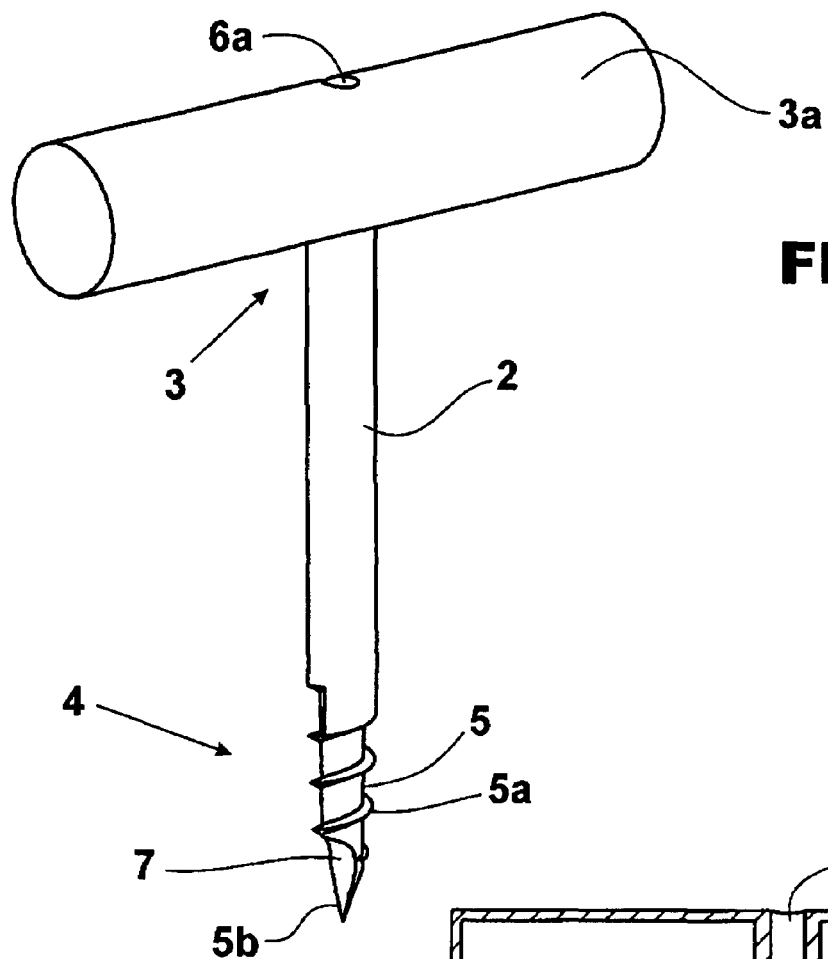
FIG. 3 is a perspective view of the accessory.

In FIGS. 1 to 4 it can be readily appreciated that the accessory 1 of the present invention is defined by a body comprising a cylindrical tubular portion 2 that can be inserted into the product which inner temperature needs to be measured, in which proximal end 3 the accessory is fitted with a traverse operator handle 3A, while its distal portion 4 comprises a section 5 of smaller diameter and a helical cutting edge 5a as well as a distal end 7 with the shape of a half-cane ending in a pointed end 5b. The helical cutting edge 5a, with the aid of the pointed end 5b, allows to cut the piece of partially or totally frozen meat, and penetrate therein by turning accessory 1 around the longitudinal geometric axis of the tubular portion 2, by means of the operator handle 3a.

Both the handle 3a and the tubular portion 2 are preferably made of a thermo-conducting material of high thermal conductivity, although it is also possible that only the distal portion 4 has thermal conductivity properties.

Optionally, according to what is most suitable in the practice, the handle 3a and the tubular portion 2 can be made as a single piece, or else the handle 3a can also be a body removably fixed to said tubular portion 2. In either case, the handle 3a comprises a hole 6a connecting to the longitudinal cavity 6 to enclose the temperature sensing element.

Figure 4:
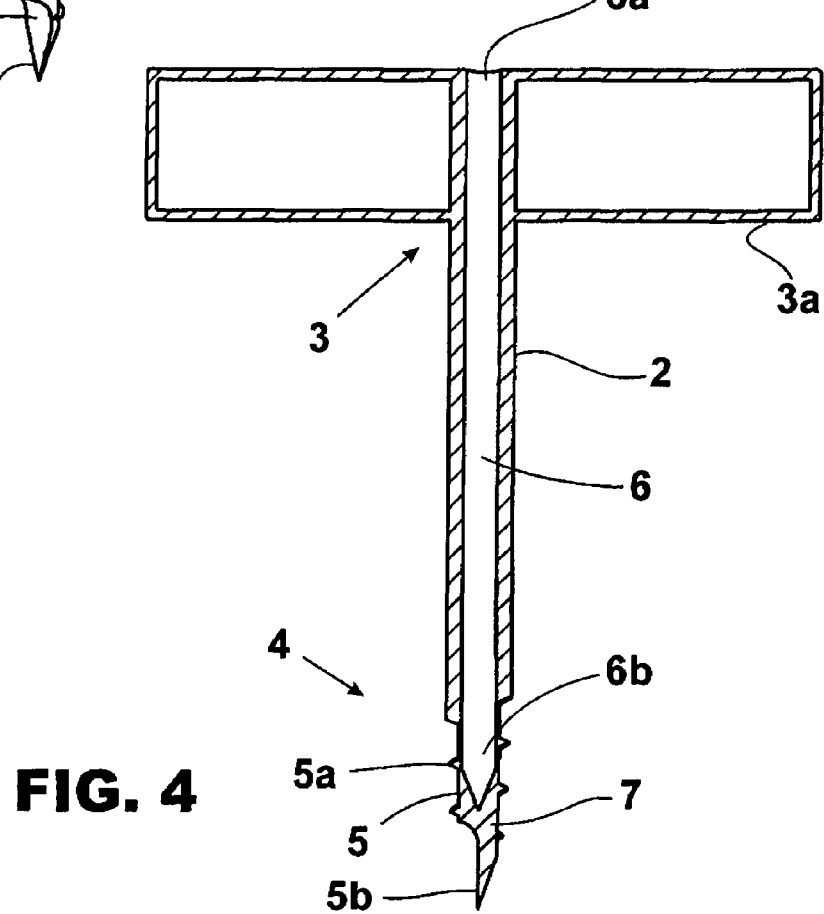
FIG. 4 is an elevational front view and a longitudinal cross sectional view of the accessory.
Figure 5:
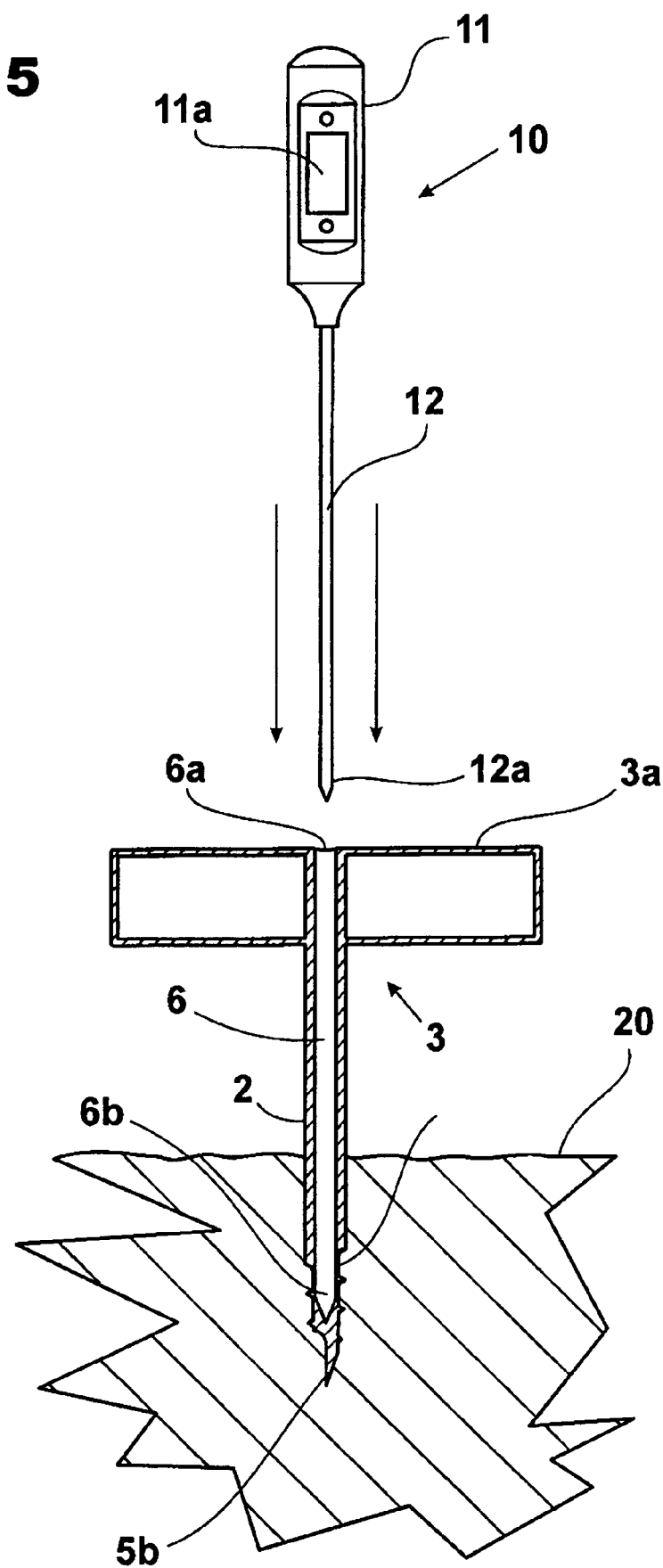
FIG. 5 is an elevational front view and a longitudinal cross sectional view of the accessory, on top of which a "meat probe" type thermometer is shown.
Figure 6:
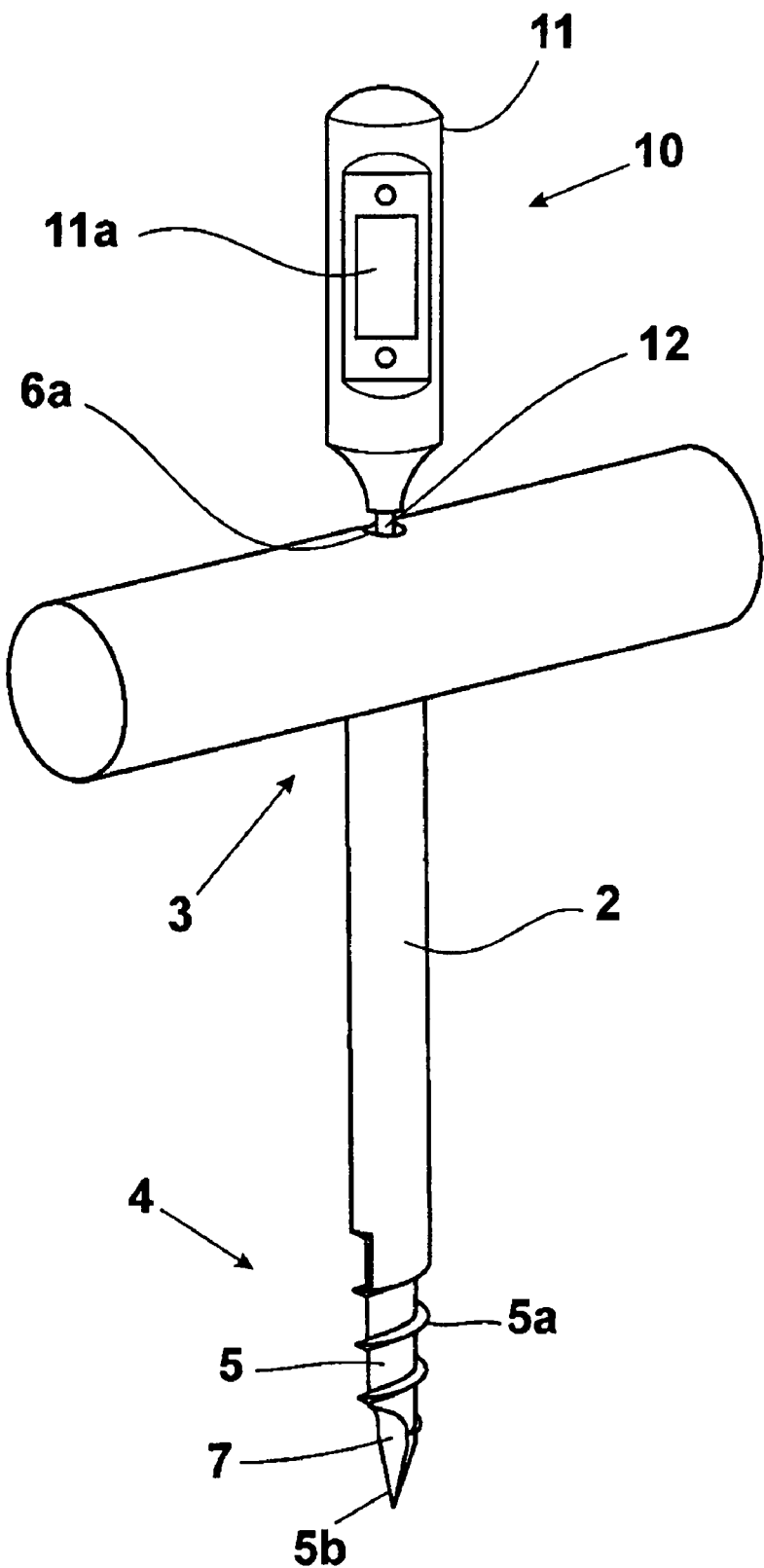
FIG. 6 is a perspective view of the accessory with the "meat probe" type thermometer inserted therein.
Figure 7A:
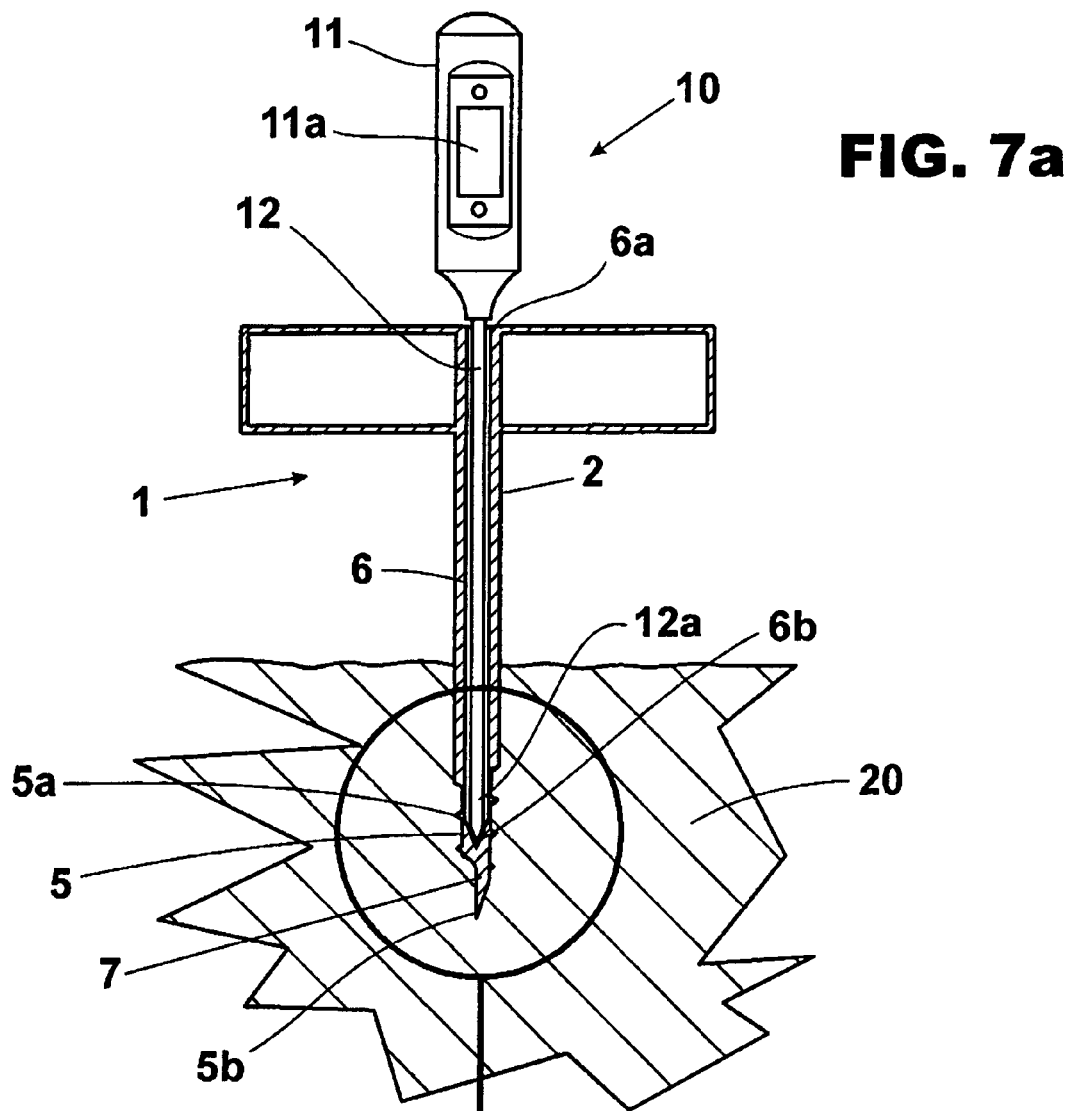
FIG. 7a is a longitudinal cross-sectional view of the accessory already inserted into a piece of frozen meat, together with a "meat probe" type thermometer inserted therein.
Figure 7B:
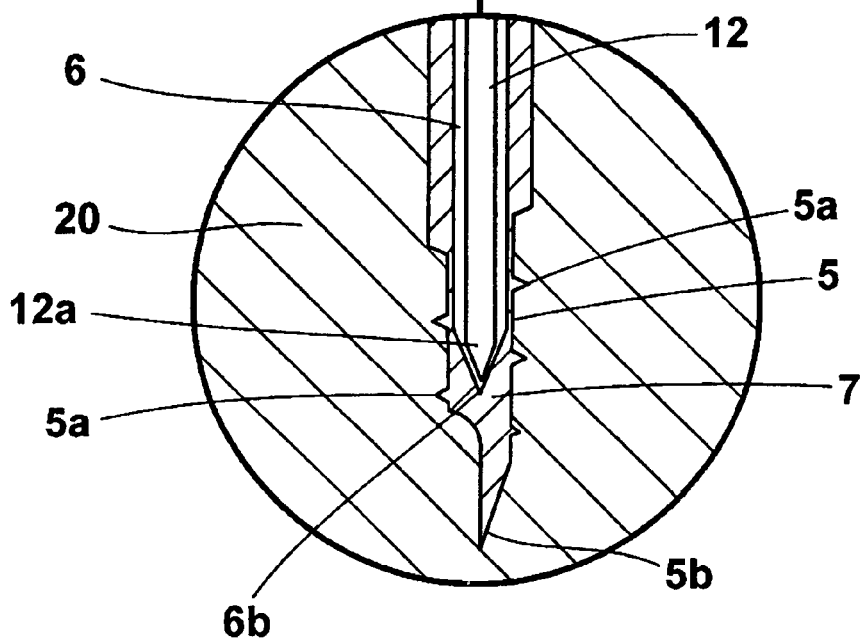

FIGS. 4 to 6 show that the tubular portion 2 comprises a longitudinal cavity 6 to enclose a temperature sensing element, such as a thermistor, a thermocouple or a thermometer 10, for example of the "meat probe" type. The cavity 6 reaches the proximity of the pointed end 7, therefore the temperature sensing element is conveniently located very close to the inner portion of the meat piece 20 in order to measure its temperature, as shown in FIGS. 7 and 7b; the separation between the temperature sensing element and the meat piece is given by the thickness of the surrounding wall corresponding to the distal portion 4 in the bottom 6b of the longitudinal cavity 6.

Once the tubular portion 2 of accessory 1 has been drilled to reach the proper depth, the accessory will be able to act as a thermo-conducting intermediate between the piece of partially or totally frozen meat 20 and the measuring probe 12. The measuring probe 12 of thermometer 10 is then introduced along cavity 6 of the tubular portion 2, until its end 12a gets in intimate contact with the bottom surface 6b of said cavity (see FIGS. 7a and 7b). Shortly after, the display 11a in head 11 of the thermometer 10 (which in this example is a digital thermometer) displays the temperature value sensed by the measuring probe 12.

It should be mentioned that several embodiments of the accessory of the invention have been envisioned for their provision to end users. For example, accessory 1 can be provided as a kit of accessories of different sizes, or comprising pointed ends of different geometric configurations, but in every case according to what is herein described and claimed.

What is claimed is:

1. An accessory for facilitating the measuring of temperature in frozen products, the accessory comprising:
   a sturdy body comprising a cylindrical tubular portion having a first end, a second end, and a hollow central cavity;
   a removable handle located on the first end of the body;
   wherein the hollow central cavity of the body is dimensioned to allow passage of a removable temperature sensing element;
   wherein the second end of the body comprises a section of small diameter and a helical cutting edge that is unitary with the cylindrical tubular portion;
   wherein the second end of the body is adapted to be inserted inside the frozen product;
   wherein at least the second end of the body is made of a thermo-conducting material
   wherein the removable temperature sensing element does not form part of the accessory and wherein the removable temperature sensing element is inserted and removed from the accessory through the hollow central cavity as needed.

2. The accessory according to claim 1, wherein the hollow central cavity extends through to the second end of the body.

3. The accessory according to claim 1, wherein the handle further comprises a central hole aligned with the hollow central cavity of the body and is adapted to enclose a top end of the temperature sensing element.

4. The accessory for measuring temperature according to claim 1, wherein the handle and the tubular portion are made of a thermo-conducting material.

5. An accessory for facilitating measuring temperature in frozen products, the accessory consisting of:
   a body comprising a cylindrical tubular portion having a first end, a second end, and a hollow central cavity;
   a removable handle located on the first end of the body;
   wherein the hollow central cavity of the body is dimensioned to allow passage of a removable temperature sensing element;
   wherein the second end of the body comprises a section of small diameter and a helical cutting edge;
   wherein the second end of the body is adapted to be inserted inside the frozen product;
   wherein at least the second end of the body is made of a thermo-conducting material;
   wherein the helical cutting edge simultaneously penetrates and cuts the frozen product as the handle is being turned;
   wherein the removable temperature sensing element does not form part of the accessory and wherein the removable temperature sensing element is inserted and removed from the accessory through the hollow central cavity as needed.

6. The accessory for measuring temperature according to claim 5, wherein the handle and the tubular portion are made of a thermo-conducting material.

7. A method for measuring temperature in frozen products, the method comprising:
1) providing an accessory comprising:
   a body comprising a cylindrical tubular portion having a first end, a second end, and a hollow central cavity;
   a removable handle located on the first end of the body;
   wherein the hollow central cavity of the body is dimensioned for passage of a removable temperature sensing element;
   wherein the second end of the body comprises a section of small diameter and a helical cutting edge;
   wherein the second end of the body is adapted to be inserted inside the frozen product;
   wherein at least the second end of the body is made of a thermo-conducting material;
   wherein the second end of the body further comprises a pointed distal end having a cane shape located next to the helical cutting edge;
2) inserting the accessory into the frozen food by turning the handle, thus the helical cutting edge of the accessory penetrates and cuts the frozen product;
3) measuring the temperature of the frozen food by passing the removable temperature sensing element through the hollow central cavity of the body.

* * * * *